United States Patent
Matsui

(10) Patent No.: US 10,279,707 B2
(45) Date of Patent: May 7, 2019

(54) VEHICLE SEAT

(71) Applicant: TOYOTA BOSHOKU KABUSHIKI KAISHA, Aichi (JP)

(72) Inventor: Hayato Matsui, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/835,966

(22) Filed: Dec. 8, 2017

(65) Prior Publication Data

US 2018/0162237 A1  Jun. 14, 2018

(30) Foreign Application Priority Data

Dec. 9, 2016 (JP) ................. 2016-239457

(51) Int. Cl.
| | |
|---|---|
| *B60N 2/42* | (2006.01) |
| *B60N 2/68* | (2006.01) |
| *B60N 2/07* | (2006.01) |
| *B60N 2/72* | (2006.01) |

(52) U.S. Cl.
CPC ............ *B60N 2/0732* (2013.01); *B60N 2/07* (2013.01); *B60N 2/42* (2013.01); *B60N 2/68* (2013.01); *B60N 2/682* (2013.01); *B60N 2/72* (2013.01)

(58) Field of Classification Search
CPC . B60N 2/68; B60N 2/682; B60N 2/07; B60N 2/0732; B60N 2/72; B60N 2/42
USPC .......................................... 297/452.18, 452.2
See application file for complete search history.

(56) References Cited

U.S. PATENT DOCUMENTS

| | | | | |
|---|---|---|---|---|
| 4,673,215 A * | 6/1987 | Yokoyama | ............. | B60N 2/165 297/452.18 X |
| 5,498,096 A * | 3/1996 | Johnson | ................ | F16L 13/103 297/452.2 X |
| 6,227,595 B1 * | 5/2001 | Hamelin | ............ | B60N 2/01583 296/65.01 |
| 6,755,465 B2 * | 6/2004 | Yamaguchi | .......... | B60N 2/4221 297/216.1 |
| 8,822,850 B2 * | 9/2014 | Endo | ...................... | B60N 2/002 297/452.18 X |
| 8,857,913 B2 * | 10/2014 | Schuhmacher | ...... | B60N 2/2356 297/452.2 X |
| 8,919,876 B2 * | 12/2014 | Sawada | ................ | B60N 2/4228 297/452.18 X |
| 8,919,886 B2 * | 12/2014 | Saveski | ................ | B60N 2/7058 297/452.18 |

(Continued)

FOREIGN PATENT DOCUMENTS

JP 2015-209074 11/2015

*Primary Examiner* — Rodney B White
(74) *Attorney, Agent, or Firm* — Greenblum & Bernstein, P.L.C.

(57) ABSTRACT

A vehicle seat comprises a seat cushion, seatback, a cushion side frame, a rod, a seat supporting member, and a coupling bracket. A portion of the cushion side frame and a portion of the coupling bracket are overlapped such that the cushion side frame is located outside the coupling bracket. The cushion side frame and the coupling bracket comprise a through-hole that extends along a seat-width axis through the overlapped portion of the cushion side frame and the coupling bracket. The rod is inserted into the through-hole and has a flare outer diameter outside the cushion side frame that is larger than the diameter of the through-hole in the cushion side frame.

8 Claims, 5 Drawing Sheets

(56) References Cited

U.S. PATENT DOCUMENTS

| | | | | |
|---|---|---|---|---|
| 9,010,855 B2* | 4/2015 | Yamaki | B60N 2/0232 | |
| | | | 297/452.18 X | |
| 9,403,452 B2* | 8/2016 | Subramanian | B60N 2/4221 | |
| 9,597,989 B2* | 3/2017 | Hattori | B60N 2/06 | |
| 9,637,036 B2* | 5/2017 | Shinozaki | B32B 37/18 | |
| 9,688,175 B2* | 6/2017 | Shinozaki | B60N 2/06 | |
| 9,744,883 B2* | 8/2017 | Nakagawa | B60N 2/90 | |
| 9,796,310 B1* | 10/2017 | Line | B60N 2/7094 | |
| 9,802,512 B1* | 10/2017 | Yadav | B60N 2/90 | |
| 9,821,690 B2* | 11/2017 | Nakagawa | B60N 2/90 | |
| 9,827,887 B2* | 11/2017 | Kasuga | B60N 2/68 | |
| 2006/0145522 A1* | 7/2006 | Yamada | B60N 2/236 | |
| | | | 297/452.2 X | |
| 2011/0133538 A1* | 6/2011 | Adragna | B60N 2/1615 | |
| | | | 297/452.18 | |
| 2013/0193737 A1* | 8/2013 | Morimoto | B60N 2/42718 | |
| | | | 297/452.18 | |
| 2015/0123442 A1* | 5/2015 | Linnenbrink | B60N 2/68 | |
| | | | 297/452.18 X | |
| 2015/0307009 A1 | 10/2015 | Shinozaki | | |
| 2015/0307010 A1* | 10/2015 | Nakagawa | B60N 2/6009 | |
| | | | 297/452.18 | |
| 2015/0307011 A1* | 10/2015 | Ushiyama | B60N 2/5825 | |
| | | | 297/344.1 | |
| 2015/0336477 A1* | 11/2015 | Matsui | B60N 2/682 | |
| | | | 297/452.2 X | |
| 2015/0343991 A1* | 12/2015 | Brodd | B60R 22/20 | |
| | | | 297/452.18 | |
| 2015/0360596 A1* | 12/2015 | Eisenbraun | B60R 21/207 | |
| | | | 297/452.18 X | |
| 2016/0052437 A1* | 2/2016 | Hoshi | B60N 2/682 | |
| | | | 297/452.18 | |

* cited by examiner

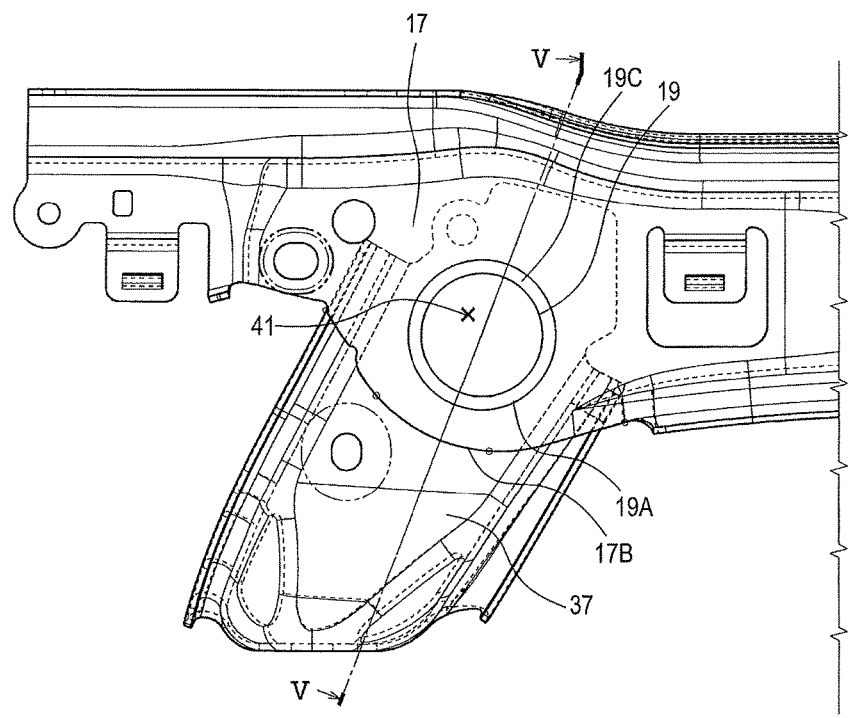
FIG. 4
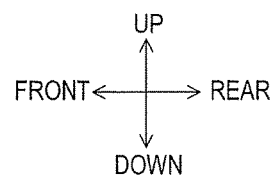

VEHICLE SEAT

CROSS-REFERENCE TO RELATED APPLICATIONS

This international application claims the benefit of Japanese Patent Application No. 2016-239457 filed on Dec. 9, 2016 with the Japan Patent Office, the entire disclosure of which is incorporated herein by reference.

BACKGROUND

The present disclosure relates to a vehicle seat.

A conventionally known vehicle seat comprises a seat cushion and a seatback. The seat cushion comprises two cushion side frames and a rod. The two cushion side frames configure a framework of the vehicle seat. The rod extends along a seat-width axis. Further, the vehicle seat comprises a seat supporting member and coupling brackets. The seat supporting member is disposed on a floor of a vehicle. The coupling brackets couple respective cushion side frames to the seat supporting member.

The coupling between the coupling brackets and the respective cushion side frames is provided in the following manner. A portion of each of the cushion side frames and a portion of each of respective coupling brackets are overlapped such that each of the cushion side frames is located outside of each of the respective coupling brackets. Each cushion side frame and corresponding coupling bracket comprise a through-hole that extends along the seat-width axis through the overlapped portion thereof. The rod is inserted through the through-hole.

A lower end of each cushion side frame and the corresponding coupling bracket are fixed to each other by welding. Hereinafter, the fixed portion is referred to as a specific fixed portion. Each cushion side frame and the corresponding coupling bracket are fixed to each other by welding in a notch that is formed in each cushion side frame. Each coupling bracket and the rod are fixed to each other by welding (see, Japanese Unexamined Patent Application Publication No. 2015-209074).

SUMMARY

When a driver's vehicle is struck from behind by another vehicle (hereinafter refer to as a rear-end collision), each cushion side frame is pulled rearward. In this case, a rearward load applies to the specific fixed portion of each cushion side frame.

To reduce rupture of each cushion side frame occurred in the specific fixed portion, a possible countermeasure is that to provide a smaller through-hole in the cushion side frame, and thereby to increase width from a lower end of the cushion side frame to the through-hole. However, the weight of the vehicle seat tends to increase due to such countermeasure.

In one aspect of the present disclosure, it is desirable to provide a vehicle seat that can reduces rupture of a cushion side frame upon the rear-end collision and an increase in the weight of the vehicle seat.

One aspect of the present disclosure provides a vehicle seat. The vehicle seat comprises a seat cushion, a seatback, two cushion side frames that configure a framework of the seat cushion, an extending rod along a seat-width axis that configures the framework of the seat cushion, a seat supporting member that is disposed on a floor of a vehicle, and at least one coupling bracket that couples at least one cushion side frame of the two cushion side frames to the seat supporting member. A portion of the at least one cushion side frame and a portion of the at least one coupling bracket are overlapped such that the at least one cushion side frame is located outside the at least one coupling bracket. The at least one cushion side frame and the at least one coupling bracket comprise a through-hole that extends along the seat-width axis through the overlapped portion thereof. The rod is inserted into the through-hole and has a flare outer diameter outside the at least one cushion side frame that is larger than the diameter of the through-hole in the at least one cushion side frame. The at least one coupling bracket is fixed to the rod.

In the vehicle seat according to one aspect of the present disclosure, the at least one cushion side frame is able to rotate freely about the rod. Thus, even when the seat cushion is pulled rearward upon, for example, the rear-end collision, a contact area between an inner circumference of the through-hole in the at least one cushion side frame and the rod can bear a load broadly, and thereby a load concentration is unlikely to occur on a part of the at least one cushion side frame. Consequently, this enables reduction of rupture occurred in the at least one cushion side frame. Furthermore, an increase in the weight of the vehicle seat can be reduced.

The rod has the flare outer diameter outside the at least one cushion side frame that is larger than the diameter of the though-hole in the at least one cushion side frame, thereby inhibiting the at least one cushion side frame from falling off the rod.

The vehicle seat according to one aspect of the present disclosure may further comprise the following Configuration 1.

(Configuration 1)

The inner circumference of the through-hole in the at least one cushion side frame is in contact with an outer circumference of the rod.

In the vehicle seat according to the present disclosure, which further comprises the configuration 1, the width from the inner circumference of the through-hole in the at least one cushion side frame to the lower end of the at least one cushion side frame is great. This further reduces the rupture occurred in the at least one cushion side frame.

BRIEF DESCRIPTION OF THE DRAWINGS

An embodiment of the present invention will be described hereinafter with reference to the accompanying drawings, in which:

FIG. 4 is a side view illustrating configurations of a left cushion side frame, a coupling bracket, and a front rod.

DETAILED DESCRIPTION OF THE PREFERRED EMBODIMENTS

1. Configuration of Vehicle Seat 1

Figure 1:
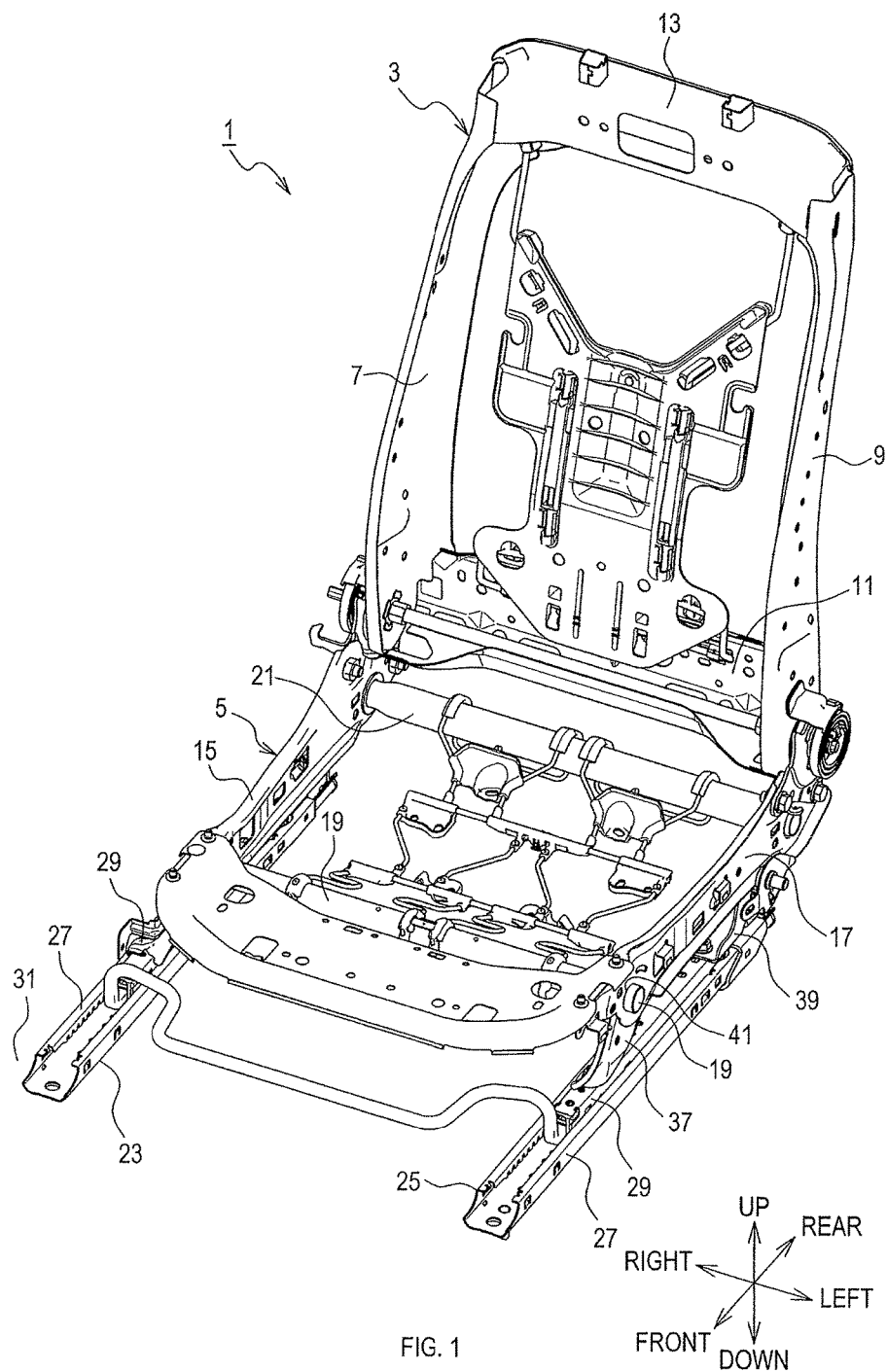
FIG. 1 is a perspective view illustrating a configuration of a vehicle seat.
Figure 2:
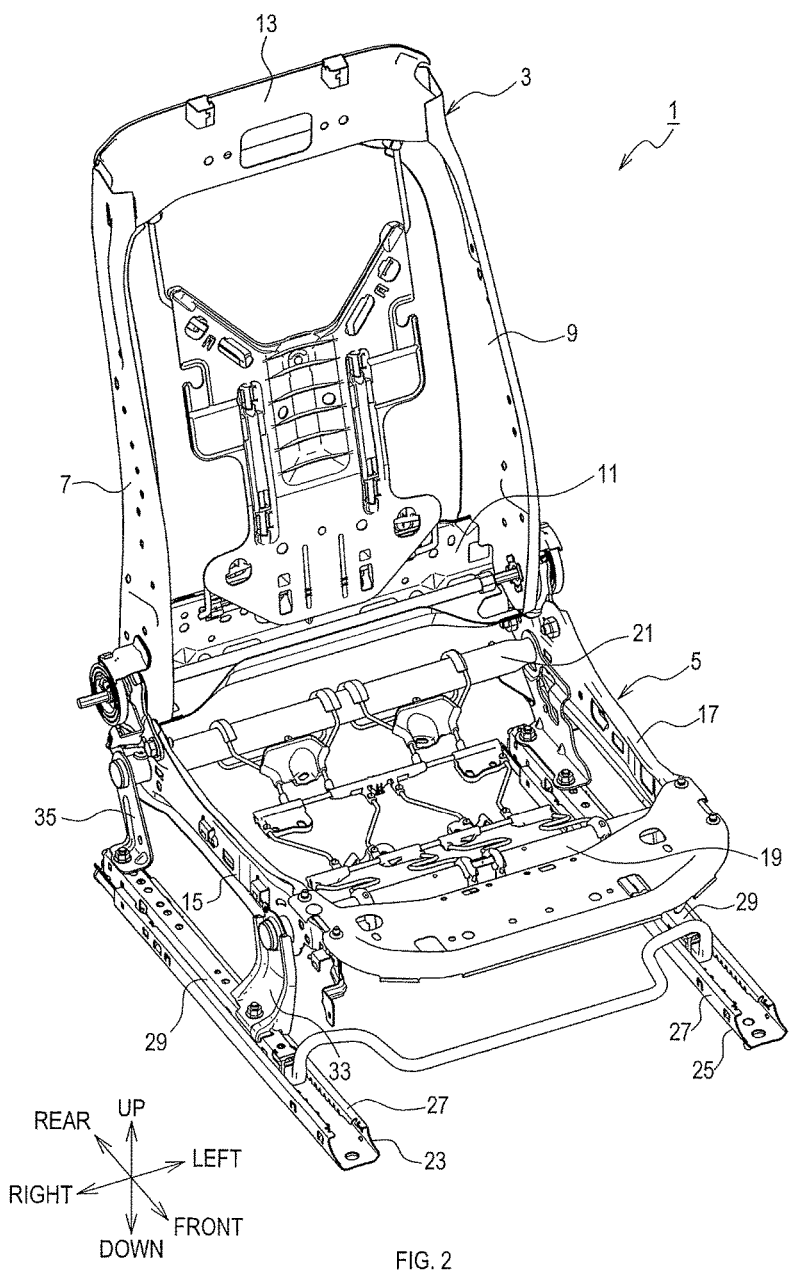
FIG. 2 is a perspective view illustrating a configuration of the vehicle seat.
Figure 3:
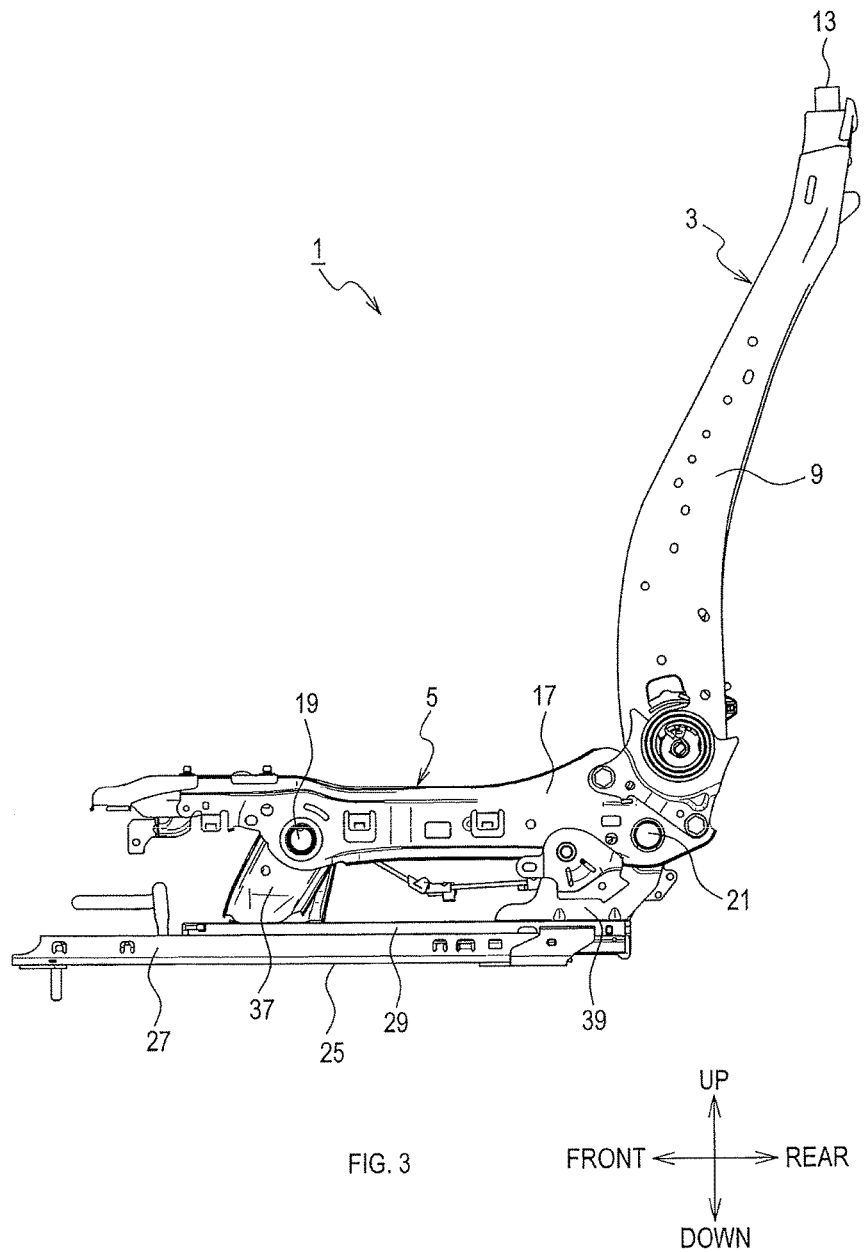
FIG. 3 is a left side view illustrating a configuration of the vehicle seat.

Descriptions of a configuration of a vehicle seat 1 will be given based on FIG. 1 to FIG. 5. The vehicle seat 1 is a seat that is mounted on an automobile. As shown in FIG. 1 to FIG. 3, the vehicle seat 1 comprises a seat back 3 and a seat cushion 5.

The seatback 3 comprises a right side frame 7, a left side frame 9, a lower panel 11, and an upper panel 13. Together, these parts configure a framework of the seatback 3 that has a substantially rectangular shape as viewed from the front.

The right side frame 7 is a member that is formed from a metal plate. The right side frame 7 is a long member that extends along an up-down axis. A thickness axis of the right side frame 7 is substantially parallel to a seat-width axis. The right side frame 7 has a shape that is gradually tapered upwardly as viewed from the right side. In addition, the right side frame 7 has an arcuate shape, curving rearwardly as viewed from the right side. The left side frame 9 is a member that is formed from a metal plate. The left side frame 9 has a shape that is laterally reversed with respect to the right side frame 7.

The lower panel 11 is a member that is formed from a metal plate. A thickness axis of the lower panel 11 is substantially parallel to a front-rear axis. The lower panel 11 extends from a lower portion of the right side frame 7 to a lower portion of the left side frame 9. The upper panel 13 extends from an upper portion of the right side frame 7 to an upper portion of the left side frame 9.

The seat cushion 5 comprises a right cushion side frame 15, a left cushion side frame 17, a front rod 19, and a rear rod 21. Together these parts configure a framework of the seat cushion 5 that has a substantially rectangular shape as viewed from the top.

The right cushion side frame 15 is a member that is formed from a metal plate. The right cushion side frame 15 is a long member that extends along the front-rear axis. A thickness axis of the right cushion side frame 15 is substantially parallel to the seat-width axis. The left cushion side frame 17 is a member that is formed from a metal plate. The left cushion side frame 17 has a shape that is laterally reversed with respect to the right cushion side frame 15.

The front rod 19 and the rear rod 21 are cylindrical members, each of the rods being formed from a metal plate. The front rod 19 extends from a front side in the right cushion side frame 15 to a front side in the left cushion side frame 17. The rear rod 21 extends from a rear side in the right cushion side frame 15 to a rear side in the left cushion side frame 17.

The vehicle seat 1 comprises a right slide rail 23 and a left slide rail 25. The right slide rail 23 and the left slide rail 25 correspond to a seat supporting member. Features of the right slide rail 23 and the left slide rail 25 enable sliding of the vehicle seat 1 along the front-rear axis.

The right slide rail 23 comprises a lower rail 27 and an upper rail 29. The lower rail 27 and the upper rail 29 are long members that extend along the front-rear axis. The lower rail 27 is fixed to a floor 31 of a vehicle. The upper rail 29 is slidably attached to the lower rail 27 along the rear-front axis. In addition, the upper rail 29 is fixed to the right cushion side frame 15 via a front right coupling bracket 33 and a rear right coupling bracket 35.

The left slide rail 25 comprises fundamentally the same configuration as the configuration of the right slide rail 23, except that the upper rail 29 is fixed to the left cushion side frame 17 via a front left coupling bracket 37 and a rear left coupling bracket 39.

Figure 5:
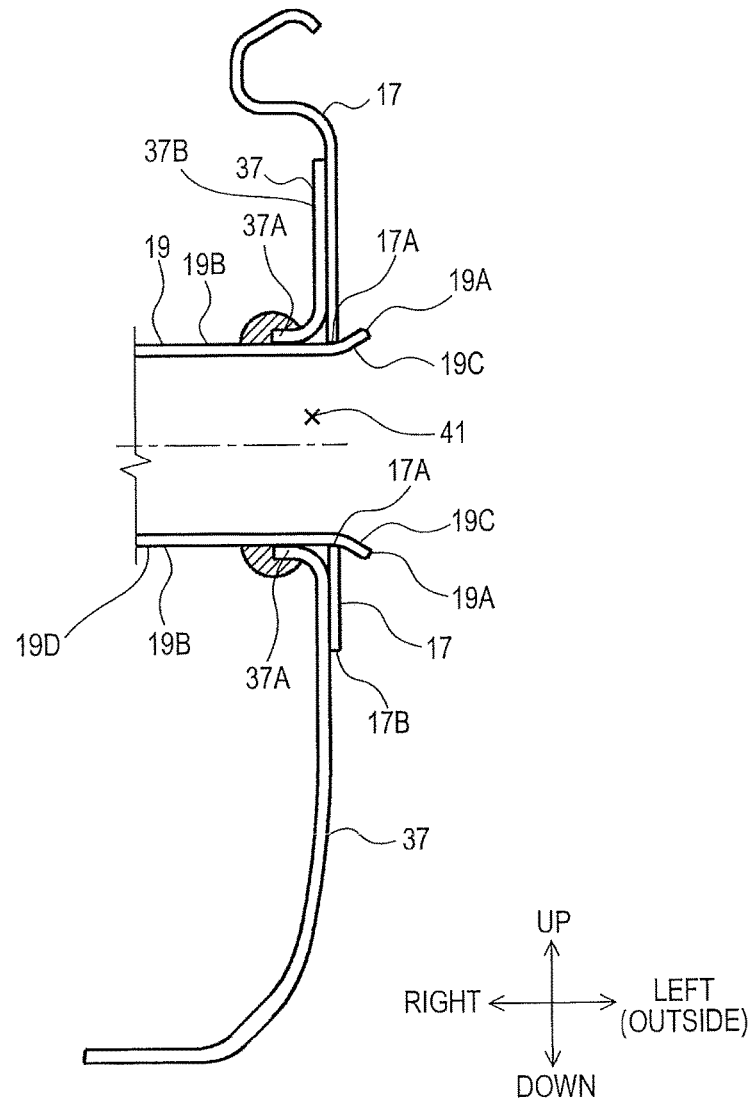
FIG. 5 is a sectional view of section V-V in FIG. 4.

As shown in FIG. 4 and FIG. 5, a portion of a lower side in the left cushion side frame 17 and a portion of an upper side in the front left coupling bracket 37 are overlapped so that the left cushion side frame 17 is located outside the front left coupling bracket 37. Note that hereinafter "outside" refers to a side that departs from a center of the vehicle seat 1 along the seat-width axis and "inside" refers to a side that directs toward the center of the vehicle seat 1 along the seat-width axis.

The left cushion side frame 17 and the front left coupling bracket 37 comprise a through-hole 41. The through-hole 41 extends through the overlapped portion of the left cushion side frame 17 and the front left coupling bracket 37 along the seat-width axis. The through-hole 41 is formed in an annular shape as viewed from the left side. The diameter of the through-hole 41 in the left cushion side frame 17 and in the front left coupling bracket 37 is same.

As shown in FIG. 5, the front rod 19 is inserted into the through-hole 41 An outer end 19A in the front rod 19 is located outside the left cushion side frame 17. An inner circumference 17A of the through-hole 41 in the left cushion side frame 17 is in contact with an outer circumference 19B of the front rod 19.

As shown in FIG. 4 and FIG. 5, the front rod 19 has a flare outer diameter 19C. The flare outer diameter 19C is located outside the left cushion side frame 17. The flare outer diameter 19C is a portion having a larger diameter than the diameter of the through-hole 41 in the left cushion side frame 17. The flare outer diameter 19C is formed in a shape with gradually outwardly increasing diameter. The left cushion side frame 17 is not fixed to the front rod 19, and thereby the left cushion side frame 17 can pivot around the front rod 19.

As shown in FIG. 5, a peripheral area 37A of the front left coupling bracket 37, which is peripheral to the through-hole 41 in the front left coupling bracket 37, is inwardly bent to become parallel to an outer surface of the front rod 19, thus increasing a contact area with the front rod 19, and facilitating welding away from the left cushion side frame 17. The peripheral area 37A and the outer circumference 19B are fixed to each other by welding. The front rod 19 includes a substantially cylindrical central portion 19D. The front left coupling bracket 37 includes a sliding portion 37D that is substantially adjacent to the left cushion side frame 17.

Coupling methods for coupling the front right coupling bracket 35 to the right cushion side frame 15, and for coupling the front left coupling bracket 37 and the rear left coupling bracket 39 to the left cushion sider frame 17 may be the aforementioned coupling method or other well-known coupling methods.

2. Effect of Vehicle Seat 1

The vehicle seat 1 provides the following effects.

(1A) In the vehicle seat 1, the left cushion side frame 17 can pivot with respect to the front rod 19. Thus, even when the seat cushion 5 is pulled rearward during, for example, a rear-end collision, a contact area between the inner circumference 17A and the outer circumference 19B can bear a load broadly, and thereby a load concentration is unlikely to occur on a part of the left side frame 17. Consequently, this enables reduction of rupture occurred in the left cushion side frame 17. Furthermore, an increase in the weight of the vehicle seat 1 can be reduced.

(1B) The front rod 19 has the flare outer diameter 19C outside the left cushion side frame 17. The flare outer diameter 19C is larger than the diameter of the through-hole 41 in the left cushion side frame 17. This can inhibit the left cushion side frame 17 from outwardly falling off the front rod 19.

(1C) In the vehicle seat 1, the inner circumference 17A is in contact with the outer circumference 19B. Accordingly, a width from the inner circumference 17A to a lower end 17B of the left cushion side frame 17 (FIG. 4, see FIG. 5) is great. This further enables reduction of the rupture occurred in the left cushion side frame 17.

<Other embodiments>

While the embodiment of the present disclosure has been described above, the present disclosure is not limited to the above-described embodiment and can be implemented in various modifications.

(1) There may be a gap between the inner circumference 17A and the outer circumference 19B. In this case, the left cushion side frame 17 can pivot with respect to the front rod 19 more smoothly.

(2) The flare outer diameter 19C may comprise other configurations. For example, the flare outer diameter 19C may be a portion where a flange, a projection, and the like are formed on the outer circumference 19B of the front rod 19.

(3) The vehicle seat 1 may be supported by the floor 31 other than by the right slide rail 23 and the left slide rail 25. In this case, a floor corresponds to the seat supporting member.

(4) The vehicle seat 1 may be a seat for a vehicle other than an automobile. Vehicles other than automobiles may include, for example, railway vehicles, aircrafts, ships and boats.

(5) Functions of one element of the above-described embodiments may be distributed to a plurality of elements. Functions of a plurality of elements may be performed by one element. Part of the configurations of the above-described embodiments may be omitted. At least part of the configurations of the above-described embodiments may be added to or replaced with the configurations of the other above-described embodiments. Any embodiment included in the technical ideas defined by the language of the claims is an embodiment of the present disclosure.

What is claimed is:

1. A vehicle seat comprising:
    a seat cushion;
    a seatback;
    two cushion side frames that configure a framework of the seat cushion;
    a rod extending along a seat-width axis and including a flare outer diameter at an outer end of the rod, the flare outer diameter being outside of at least one cushion side frame of the two cushion side frames;
    a seat supporting member that is configured to support the vehicle seat; and
    at least one coupling bracket that couples at least one cushion side frame of the two cushion side frames to the seat supporting member, wherein
    a portion of the at least one cushion side frame and a portion of the at least one coupling bracket are overlapped so that the at least one cushion side frame is located outside the at least one coupling bracket along the seat-width axis toward to the outer end of the rod,
    the at least one cushion side frame and the at least one coupling bracket each comprise a through-hole that extends along the seat-width axis through the overlapped portions of the at least one cushion side frame and the at least one coupling bracket so that the through-hole of the at least one cushion side frame is located outside of the through-hole of the at least one coupling bracket along the seat-width axis toward to the outer end of the rod, the rod is inserted into the through-hole and the flare outer diameter is larger than a diameter of the through-hole in the at least one cushion side frame, and
    the at least one coupling bracket is fixed to the rod.

2. The vehicle seat according to claim 1, wherein an inner circumference of the through-hole in the at least one cushion side frame is in contact with an outer circumference of the rod.

3. A seat cushion for a vehicle seat, the seat cushion comprising: a front rod including:
    a cylindrical central portion with an outer circumference and a central outer diameter, and
    an outer end located at a right end of the front rod, flaring radially outward, and having a flare outer diameter that is larger than the central outer diameter; a left cushion side frame including:
    a lower end located below the front rod, and
    an inner circumference defining a through-hole, wherein the through-hole is larger than the central outer diameter and is smaller than the flare outer diameter; and a front left coupling bracket including:
    a sliding portion located adjacent to and parallel to the left cushion side frame such that the left cushion side frame slides on the sliding portion during rotation of the left cushion side frame about the front rod, and
    a peripheral area bent inwardly and located adjacent to the outer circumference of the front rod, wherein
    the peripheral area of the front left coupling bracket is welded to the cylindrical central portion of the front rod,
    the left cushion side frame is free to rotate about the front rod while sliding against the sliding portion of the front left coupling bracket, and
    the left cushion side frame is retained on the front rod by the outer end of the front rod.

4. The seat cushion for the vehicle seat according to claim 3, wherein
    the peripheral area is approximately in parallel to the outer circumference of the rod.

5. The seat cushion for a vehicle seat according to claim 3, further comprising:
    a right cushion side frame that is substantially a mirror image of the left cushion side frame; and
    a front right coupling bracket that is substantially a mirror image of the front left coupling bracket.

6. The vehicle seat according to claim 1, wherein
    the two cushion side frames are pivotably arranged about the rod.

7. The vehicle seat according to claim 1, wherein
    the coupling bracket is inwardly bent and includes a peripheral area that is located in the vicinity of an outer circumference of the rod, and
    the peripheral area is approximately in parallel to the outer circumference of the rod.

8. A vehicle seat comprising:
    a seat cushion;
    a seatback;
    two cushion side frames that configure a framework of the seat cushion;
    a rod extending along a seat-width axis;
    a seat supporting member that is configured to support the vehicle seat; and
    at least one coupling bracket that couples at least one cushion side frame of the two cushion side frames to the seat supporting member, wherein
    a portion of the at least one cushion side frame and a portion of the at least one coupling bracket are overlapped so that the at least one cushion side frame is located outside the at least one coupling bracket, the at least one cushion side frame and the at least one coupling bracket each comprise a through-hole that extends along the seat-width axis through the overlapped portions of the at least one cushion side frame and the at least one coupling bracket, the rod is inserted into the through-hole and has a flare outer diameter outside the at least one cushion side frame of the two cushion side frames that is larger than the diameter of the through-hole in the at least one cushion side frame, and an inner circumference of the two cushion side frames and an outer circumference of the rod are in contact with each other, and the at least one coupling bracket is fixed to the rod.

* * * * *